United States Patent
Steinbichler et al.

(10) Patent No.: US 6,924,888 B2
(45) Date of Patent: Aug. 2, 2005

(54) PROCESS AND APPARATUS FOR RECORDING THE DEFORMATION OF OBJECTS

(75) Inventors: Hans Steinbichler, Neubeuern (DE); Volker Rasenberger, Raubling (DE); Rainer Huber, Piding (DE); Roman Berger, Schnaitsee (DE)

(73) Assignee: Steinbichler Optotechnik GmbH, Neubeurn (DE)

(*) Notice: Subject to any disclaimer, the term of this patent is extended or adjusted under 35 U.S.C. 154(b) by 71 days.

(21) Appl. No.: 09/996,239

(22) Filed: Nov. 28, 2001

(65) Prior Publication Data

US 2002/0135751 A1 Sep. 26, 2002

(30) Foreign Application Priority Data

Nov. 29, 2000 (DE) .......................................... 100 58 887
Jan. 11, 2001 (DE) .......................................... 101 01 057

(51) Int. Cl.$^7$ ................................................. G01B 9/02
(52) U.S. Cl. ...................................................... 356/35.5
(58) Field of Search ............................... 356/35.5, 450, 356/479, 496, 497, 512, 520

(56) References Cited

U.S. PATENT DOCUMENTS

| | | | | |
|---|---|---|---|---|
| 4,850,693 A | * | 7/1989 | Deason et al. .............. | 356/35.5 |
| 5,467,184 A | | 11/1995 | Tenjimbayashi | |
| 5,481,356 A | * | 1/1996 | Pouet et al. ................ | 356/35.5 |
| 6,031,602 A | * | 2/2000 | Parker et al. ............... | 356/35.5 |
| 6,128,082 A | * | 10/2000 | Cloud .......................... | 356/503 |
| 6,417,916 B1 | * | 7/2002 | Dengler et al. ............. | 356/35.5 |

FOREIGN PATENT DOCUMENTS

| | | |
|---|---|---|
| DE | 3600672 | 7/1987 |
| DE | 4231578 | 3/1994 |
| DE | 19639213 | 3/1998 |
| DE | 19859725 | 7/2000 |
| DE | 19906681 | 9/2000 |
| EP | 0419936 | 4/1991 |
| WO | WO00/34738 | 6/2000 |

OTHER PUBLICATIONS

Fomitchov et al, "A Compact dual–purpose Camera for shearography and electronic speckle–pattern Interferometry", Mens. Sci. Technol. 8 (1997), pp. 581–583.

* cited by examiner

Primary Examiner—Gregory J. Toatley, Jr.
Assistant Examiner—Michael A. Lyons
(74) Attorney, Agent, or Firm—Dilworth & Barrese

(57) ABSTRACT

A process serves to record the deformation of objects (1). In order to facilitate reliable evaluation even in the case of relatively large deformations, during the deformation of the object (1) a sequence or series of images of the object is recorded with a measuring process. The differential between two sequential images is formed. These differentials are integrated (FIG. 1).

29 Claims, 2 Drawing Sheets

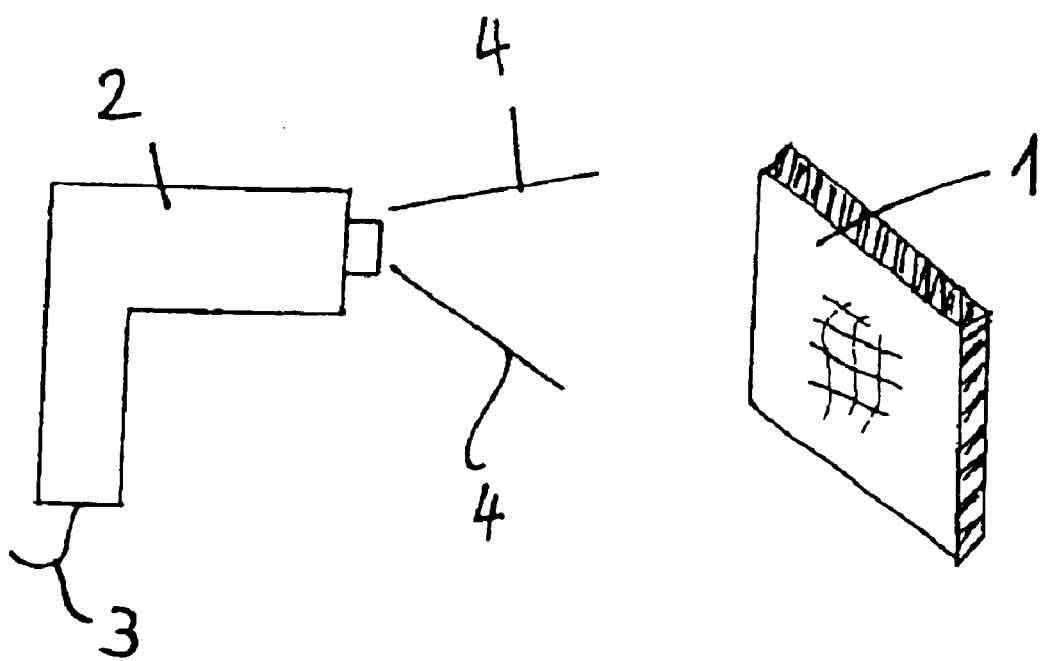

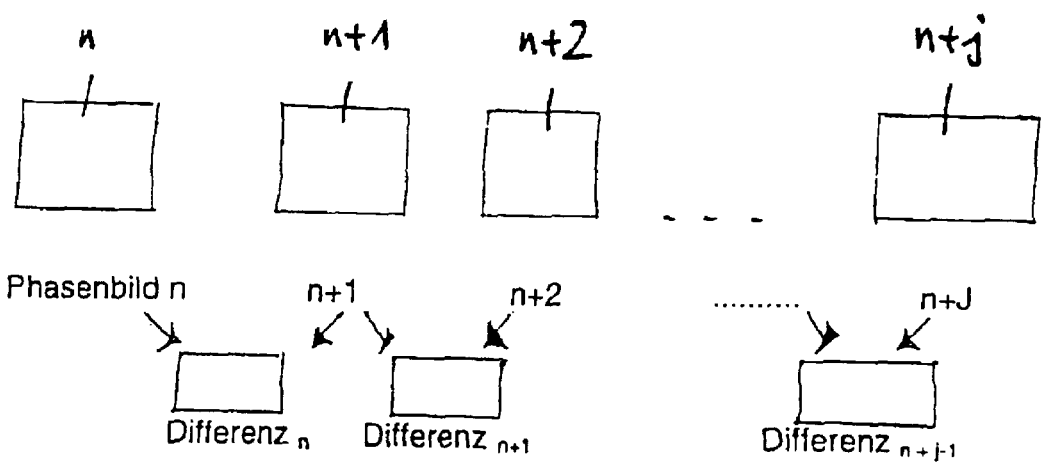

PROCESS AND APPARATUS FOR RECORDING THE DEFORMATION OF OBJECTS

BACKGROUND OF THE INVENTION

The invention entails a process for recording the deformation of objects and an apparatus for performing the type of process concerned.

Processes and facilities of this type are used for a wide range of purposes, particularly in the non-destructive testing of materials, and especially of composite materials, and in the testing of tyres (motor vehicle tyres). An object, for example a material, composite material, workpiece, tyre or similar, is deformed through the influence of pressure, vacuum, heat or some other means. The object is measured in various states of deformation. Using the measurements, it can be determined whether the object exhibits a defect, and particularly a flawed area.

SUMMARY OF THE INVENTION

In tyre testing, the tyre may be placed in a vacuum chamber. The tyre may be mounted on the rim or placed in the vacuum chamber without a rim. As the pressure is reduced, the air enclosed in a flawed area in the tyre leads to local expansion which can be detected by measurement.

A process for measuring the surface of a 3D body is known from EP 419 936 B1. According to this process, an object can be irradiated with coherent radiation, and in particular a beam of light. The reflected radiation is imaged in a focal plane by an imaging optics system, in which plane is located a planar sensor or an image sensor, preferably a CCD sensor. A reference beam with a carrier frequency is superimposed on the sensor. In this case, the imaging optics system is designed or adjusted such that the image of a speckle in the focal plane generated by the coherent radiation on the body covers at least three sensor elements (pixels). This ensures that a complete phase measurement is possible with a single frame. The phase of the radiation from the object is determined by intensity signals from the sensor elements.

In the prior-art processes for recording the deformation of objects, difficulties can arise if the deformations are relatively large. In this case, the intervals between the various interference lines may be very small with the result that they can only be distinguished with difficulty, or may not be distinguishable at all, so hampering or negating evaluation.

The task of the invention is to introduce a process and an apparatus of the type mentioned at the beginning which facilitates reliable evaluation even in the case of relatively large deformations.

According to the invention, this task is achieved in the case of a process of the generic type mentioned at the beginning, by the following characteristics. During the deformation of the object, a sequence or series of images of the object is recorded with a measuring process. The differential (increment) between two sequential images is formed and this is then added to the first image. In the subsequent series of operations performed in the process, the differentials are formed between each two sequential images, and these differentials are added to the preceding image in each case. In this way, the incremental deformations are thus added to together, i.e., integrated. The integrated differentials yield the total deformation of the object.

In the process according to the invention, a relatively large number of images are recorded per unit time. In the practical application of the process, it is possible to record the images at the normal video clock frequency of 25 frames per second.

However, it is also possible to apply different image frequencies. In the case of slow deformations, image frequencies of one frame per minute or even lower may be applied. However, it is also possible to record the images at higher frequencies of up to one million frames per second.

In this process, a certain image is used as the starting image. Then the differentials of two sequential images are calculated and successively added together. As a relatively large number of images are recorded per unit time, these images differ by only a comparatively small degree of deformation in each case. The images are recorded during application of the load, i.e. during the advancing deformation process. As a relatively large number of images is recorded per unit time, the interference lines or projection lines are far enough away from each other in order to ensure that they can always be readily evaluated. The deformations are added together, i.e. integrated. In this way, it is also possible to record large deformations.

Preferred embodiments of the invention are described herein.

The images of the object can be recorded by means of an interferometry process. Suitable interferometry processes include, for example, holographic interferometry, electronic speckle pattern interferometry (ESPI) or speckle shearing interferometry. The images of the object can, however, also be recorded by means of a projection process. This may take the form of, in particular, a grid projection process or a Moiré process.

Phase images can be determined from the recorded images. In this case, the differentials between sequential phase images are formed and these differentials are then added to the preceding phase image in each case. The phase images can be determined, for example, according to the process described in EP 419 936 B1, to which express reference is hereby made. According to this process, the phase image is determined from the image on the CCD sensor in a fashion as already explained above, i.e. the phase image is determined from a single frame. From the directly recorded deformation images or interference line images are calculated phase images which are then evaluated using the described incrementation and integration method. If the phase image in each case is determined from a single frame, as can occur in accordance with EP 419 936 B1, the process can be significantly accelerated. It can be performed at the usual video cycle frequency.

It is possible to determine and evaluate a demodulated phase image.

A further preferred embodiment is characterised by the fact that the object is irradiated with coherent radiation or coherent light, preferably a laser light, or with partially coherent radiation or partially coherent light. In particular, the object may be irradiated by a laser diode. According to a further preferred embodiment of the invention, the object is irradiated by several laser diodes. The use of one or several laser diodes is particularly advantageous because laser diodes are relatively inexpensive. When using several laser diodes, these may be arranged such that the areas illuminated by the laser diodes do not overlap, or only slightly overlap at the edges. It is, however, also possible to arrange the diodes such that the illuminated areas of two or several or all the laser diodes overlap.

A particular advantage of the process according to the invention lies in the fact that the images or phase images of the object may be recorded using a hand-held sensor. The sensor used for the measuring process, or the housing in which this sensor is arranged, can thus be held in the hand. This can, of course, give rise to disruptions. These disruptions, which are caused by the fact that the hand-held sensor can never be kept completely still, are however compensated for by the relatively high image frequency over time. Given a sufficiently fast sequence of individual images, it is consequently possible to use a hand-held sensor, for example a hand-guided ESPI sensor or shearing sensor, particularly in combination with an electronic shake-suppression system. The precondition here is that the image frequency is so high that the disturbances generated by holding the sensor in the hand are small by comparison. The shaking of the hand, and also other disruptions which are caused by external influences, and which can also arise with a stationary test set-up, can be averaged out over time.

A further preferred embodiment of the invention is characterised by the fact that a disrupted image or phase image is not included in the evaluation. The evaluation of the image or phase image is performed in the manner described above with the differential being formed between two sequential images or phase images, and this differential then being added to the preceding image or phase image in each case. If an image or phase image, or the differential formed from it, is disrupted, the image or phase image, or the differential, is, according to the preferred embodiment, precluded from the evaluation.

Such a disrupted image or phase image, or such a disrupted differential, can particularly arise when using laser diodes. Laser diodes execute so-called mode jumps. These are sudden changes in wavelength, the occurrence of which is unpredictable and random. The wavelength changes suddenly by a minimal quantity. If such a mode jump occurs between two sequential images or phase images, this produces a disrupted image or phase image or a disrupted differential, and the evaluation is likewise disrupted. In order to eradicate errors caused by the mode jump or some other phenomenon, the image or phase image, or the differential, can be excluded from the evaluation.

The disrupted image or phase image, or the differential formed therefrom, can be ignored as being of negligible significance. Given a sufficiently fast sequence of individual images, the error caused by this can likewise be ignored as negligible.

However, it is also possible to fill the gap caused by the disrupted image or phase image, or the disrupted differential, by using the preceding and/or following differential. This is particularly possible in the case of essentially linear deformations and if the image sequence is so fast that approximately linear relationships prevail between sequential images. In this case the deformation appertaining to the disrupted image or phase image is extrapolated from the adjacent time intervals. The missing interval is replaced by the preceding differential and/or the following differential.

In order to be able to perform an evaluation even in the case of a discounted image or phase image, the resolution should be selected such that it is still possible to effectively distinguish between the interference lines or projection lines if an image is omitted. The theoretical minimum interval between two adjacent lines is two pixels. In order to ensure reliable evaluation, however, the interval between two adjacent lines should be at least four or five pixels. This will ensure that the lines are still readily distinguishable even if an image or phase image should be omitted.

The recorded images or phase images can be visualised as a film.

It is possible to compare any timeframes of the deformation with one another.

The task on which the invention is based is achieved in the case of an apparatus for recording the deformation of objects by a measuring device for recording a sequence of images of the object during the deformation of said object, and by an evaluation device for forming the differential between two sequential images and for integrating the differential.

Preferred embodiments of the apparatus according to the invention are described below.

BRIEF DESCRIPTION OF THE DRAWINGS

An embodiment of the invention is explained in the following on the basis of the enclosed drawing. In the drawing FIG. 1 shows a schematic representation of a measuring device and an object, and FIG. 2 shows the formation of differentials between sequential phase images.

DESCRIPTION OF THE PREFERRED EMBODIMENTS

As indicated in FIG. 1, an object 1, e.g. a tyre or a composite material, is continuously observed by a sensor head 2. Object 1 is deformed, e.g. by pressure, vacuum, heat or similar. Sensor head 2 can be held in the hand. It is connected via a line 3 to an evaluation unit, e.g. a PC or other computer.

The sensor head may take the form of a device which operates in accordance with the process described in EP 419 936 B1. Sensor head 2 exhibits laser diodes which irradiate object 1 with laser light 4.

Sensor head 2 continually records images of object 1. This occurs during the deformation of object 1. In order to record the images, sensor head 2 is equipped with a CCD sensor. The images are recorded at a frequency of 1,000 frames per second. This frequency is generally sufficient if sensor head 2 is hand-held. It should be noted, however, that the displacement between two sequential images must be no greater than 1 micron. This can generally be achieved in the case of hand-held sensor heads operating at a frequency of 1,000 frames per second. If sensor head 2 is fixed in position, substantially lower image frequencies may be applied. The images can then be recorded at video clock frequency (25 frames per second) or even—depending on the application—at a lower or higher frequency.

Phase images are constantly calculated from the images. This is preferably performed using the single-frame technique where one phase image is calculated from each frame. This may be performed in accordance with the process described in EP 419 936 B1. An image of object 1 in its state at rest is not necessary.

The differentials between sequential phase images describe the deformation between two frame times in each case. This is schematically represented in FIG. 2. The deformation between two random recording times is calculated from the $2\pi$-modulated sum of the differentials of all intervening frames.

As shown in FIG. 2, the differential n is formed from the differential between the subsequent phase image n+1 and the preceding phase image n. The differential n+1 is formed from the then subsequent phase image n+2 and the then preceding phase image n+1, and so on. The differentials are, moreover, continuously added up. The sum of the integrated differentials yields the total deformation.

For each frame (each image or phase image), a series of deformation images can be calculated by calculation of the sum of all n subsequent deformations (n=1, 2, 3 . . . ). As a result, the deformation can be visualised as a film or in a type of film.

Any portions of a deformation process can be individually viewed. This may be particularly advantageous if, owing to a limited lateral resolution of the sensor head, the entire deformation is not reproducible, or if the stripe density is greater than the pixel resolution.

Disruptions that occur within the deformation process can be suppressed or bridged. If an image disturbance occurs between two frame conditions, for example due to a mode jump in the irradiation lighting, due to heat-induced striae, or due to the component and/or sensor head tilt, the disruption is not included in the evaluation. This can be ensured by ignoring the differential from the two associated images or phase images, between which the disruption has occurred when adding up the sum of the differentials, with the result that the disruption is omitted from the results pattern. This procedure enables, inter alia, the use of laser diodes instead of expensive lasers for many measurement tasks. The deformation that occurs during the suppressed period can be ignored as negligible given a sufficiently fast sequence of individual frames. In the case of linear deformations or deformations which can be regarded with sufficient approximation as linear, the deformation during the suppressed period can be extrapolated from the adjacent time intervals.

The disruptions requiring suppression can be detected within the series of deformation images either manually or automatically.

In non-destructive material testing, the atypical workpiece deformation actually being investigated is frequently superimposed by a typical "whole-body deformation". In many cases, the extent of this whole-body deformation is significantly larger than that of the sought defect in the object. Consequently it is often impossible to visualise the defects because the superimposed global deformation already exceeds the dynamic capabilities of the measurement arrangement before the sought defect can become sufficiently apparent.

In order to render such "concealed" defects visible, a global reference area can be subtracted from each individual differential, and the corrected individual differentials can then be added together.

In addition, unwanted deformations can in many applications be separately recorded and subtracted from the combination of desired and undesired deformations which has been recorded.

This can be explained on the basis of an example in which tyres with defects are placed in a vacuum chamber. The defects increase as the pressure in the vacuum chamber decreases. They can be rendered visible by shearography. The deformation caused by the defects is the "desired" deformation that is to be determined and rendered visible. After a deformation process, which for example can be caused by placement in the test chamber, the tyres tend gradually to resume their original shape. This is then the "undesired whole-body deformation" which is superimposed on the actual atypical, desired deformation under investigation. When testing tyres, this whole-body deformation is extensively unrelated to the applied negative pressure.

By measuring the deformation in accordance with the invention during a change in negative pressure, the total deformation representing a combination of the desired and undesired components is measured. By performing a measurement (reference measurement) without a change in the negative pressure, it is possible to determine the undesired component (undesired whole-body deformation). By subtracting the undesired deformation from the combined total deformation, it is possible to obtain the desired component of the deformation.

A prerequisite for this is that the two measurements are performed immediately one after the other and that both measurements are allowed to continue until the portion of undesired deformation is of an identical size in both cases. Alternatively, the results, for example, in accordance with the total time difference of the individual deformations, can be scaled in order to obtain the same portion of undesired deformation component before this is deducted from the combined total deformation.

Consequently, a preferred embodiment of the invention is characterised by the fact that the whole-body deformation is subtracted from the total deformation. This enables the desired deformation to be obtained. A further preferred embodiment is characterised by the fact that undesired deformations are subtracted from the total deformation. The undesired deformations are, in this case, preferably determined from reference measurements. The reference measurements can be performed without development of the desired deformation.

It is advantageous if the subtraction of the whole-body deformation or undesired deformation from the total deformation in the images or phase images is performed prior to formation of the sum of the differentials between the images or phase images. It is possible to increase the measurement dynamics by subtracting the whole-body deformation in the individual differential images prior to integration to produce the total deformation. Preference is given to a subtraction of undesired deformations which are determined from reference measurements without development of the desired deformation.

What is claimed is:

1. Process for recording deformation of an object (1), comprising the steps of recording a sequence of images of the object (1) during deformation, determining phase images from the recorded images, forming a differential between two sequential phase images (n+1, n+2), and adding the differential to a first image, whereby incremental deformations are integrated to provide total deformation of the object.

2. The process of claim 1 comprising the additional step of forming a differential between each two sequential phase images (n+1, n+2, . . . ), and adding each said differential to a preceding image.

3. The process of claim 2, comprising the steps of using a certain image as a starting image, calculating the differentials of two sequential images and successively adding the differentials together, and recording the images during advancing deformation of the object (1).

4. The process of claim 2, comprising the steps of calculating deformation between two random recording times from a $2\pi$ modulated sum of the differentials of all intervening frames, forming a differential (n) between a subsequent phase image (n+1) and a preceding phase image (n), forming a differential (n+1) from a subsequent phase image (n+2) and an immediately preceding phase image (n+1), and continuously adding up all formed differentials, whereby a sum of the integrated differentials yields the total deformation of the object (1).

5. The process of claim 4, comprising the step of calculating a series of deformation images for each image or phase image, by calculating a sum of all (n) subsequent deformations (n=1, 2, 3 . . . ).

6. The process of claim 1, comprising the step of recording the images with interferometry or projection.

7. The process of claim 6, comprising the step of providing an interval between two adjacent interference or projection lines of at least four pixels, to ensure the lines are readily distinguishable even when an image or phase image is omitted.

8. The process of claim 1, wherein the interferometry is selected from holographic interferometry, electronic speckle pattern interferometry (ESPI) and speckle shearing interferometry and the projection is either a grid projection process or a Moiré process.

9. The process of claim 1, wherein each said phase image is determined from a single recorded image.

10. The process of claim 1, comprising the step of irradiating the object (1) with one of coherent radiation, coherent light, partially coherent radiation and partially coherent light.

11. The process of claim 10, comprising the step of irradiating the object (1) with at least one laser diode.

12. The process of claim 11, comprising the step of irradiating the object (1) with several laser diodes having either overlapping or non-overlapping illumination areas.

13. The process of claim 1, comprising the step of recording the images of the object (1) with a hand-held sensor (2).

14. The process of claim 13, comprising the step of maintaining displacement between two sequential images no greater than one micron.

15. The process of claim 1, comprising the step of precluding a disrupted image or phase image or the differential formed therefrom, from evaluation.

16. The process of claim 15, comprising the step of filling a gap caused by the precluded image or differential, with at least one of a preceding and subsequent differential.

17. The process of claim 1, comprising the step of visualizing the recorded images or phase images or differentials formed therefrom, as a film.

18. The process of claim 1, comprising the step of comparing time frames or phases of the deformation with one another.

19. The process of claim 1, comprising the step of subtracting a whole body deformation or an undesired deformation of the object (1) from the total deformation.

20. The process of claim 19, comprising the step of determining the undesired deformation from a reference measurement.

21. The process of claim 19, comprising the step of subtracting the whole body or undesired deformation from the total deformation in the images or phase images prior to forming the sum of the differentials between the images or phase images.

22. The process of claim 21, comprising the steps of placing a tyre, as the object (1), in a vacuum chamber and decreasing pressure within the vacuum chamber to render visible any defects in the tyre by shearography, after deformation, when the tyre tends to gradually resume original shape constituting the whore-body or undesired deformation, subtracting the whole body or undesired deformation from combined total deformation.

23. Apparatus for recording deformation of an object (1), comprising a measuring device (2) structured and arranged for recording a sequence of images of the object (1) during deformation, an evaluation device structured and arranged to determine phase images from the respective recorded images, forming a differential between two sequential phase images (n+1, n+2), and adding the differential to a first image, whereby incremental deformations are integrated to provide total deformation of the object (1), and a line (3) interconnecting said measuring device (2) and evaluation device.

24. The apparatus of claim 23, wherein said evaluation device is structured and arranged to form a differential between each two sequential phase images (n+1, n+2, . . . ), and add each said differential to a preceding image.

25. The apparatus of claim 23, wherein said measuring device (2) operates by interferometry or projection.

26. The apparatus of claim 25, wherein the measuring device (2) includes a source for one of coherent radiation, coherent light, partially coherent radiation and partially coherent light.

27. The apparatus of claim 26, wherein said measuring device (2) comprises at least one laser diode.

28. The apparatus of claim 23, wherein said measuring device (2) is a hand-held sensor.

29. The apparatus of claim 23, additionally comprising means coupled to said evaluation device for visualizing the recorded images or phase images as a film.

\* \* \* \* \*